(12) United States Patent
Chen et al.

(10) Patent No.: US 10,218,638 B2
(45) Date of Patent: Feb. 26, 2019

(54) ADAPTIVE MECHANISM FOR EFFICIENT USER CREDENTIALS IDENTIFICATION IN A DYNAMIC HARDWARE ENVIRONMENT

(71) Applicant: INTERNATIONAL BUSINESS MACHINES CORPORATION, Armonk, NY (US)

(72) Inventors: Lei Chen, Shanghai (CN); Yang Liu, Shanghai (CN); Da Lu, Shanghai (CN); Scott R. Murray, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/219,583

(22) Filed: Jul. 26, 2016

(65) Prior Publication Data

US 2018/0034826 A1 Feb. 1, 2018

(51) Int. Cl.
*H04L 12/931* (2013.01)
*H04L 29/06* (2006.01)

(52) U.S. Cl.
CPC ............ *H04L 49/20* (2013.01); *H04L 63/083* (2013.01); *H04L 63/0876* (2013.01); *H04L 69/18* (2013.01)

(58) Field of Classification Search
CPC ....... H04L 63/12; H04L 63/126; H04L 63/10; H04L 63/102; H04L 49/20; H04L 61/103; H04L 69/18; H04L 63/083; H04L 63/0876

See application file for complete search history.

(56) References Cited

U.S. PATENT DOCUMENTS

| 7,536,486 | B2 | 5/2009 | Sadovsky et al. |
| 9,716,727 | B1* | 7/2017 | Seger ................. H04L 63/1491 |
| 2011/0277019 | A1* | 11/2011 | Pritchard, Jr. ...... H04L 63/0815 726/4 |
| 2015/0039787 | A1 | 2/2015 | Voorhees et al. |
| 2016/0134599 | A1* | 5/2016 | Ross ..................... H04L 63/08 713/168 |

* cited by examiner

*Primary Examiner* — Robert B Leung
*Assistant Examiner* — Ayoub Alata
(74) *Attorney, Agent, or Firm* — Richard A. Wilhelm

(57) ABSTRACT

In various embodiments of the present invention, a method, computer system, and computer program product is implemented to identify a target device that is obtained based on state information of a plurality of ports in the target device, a type of the target device is identified based on the obtained identifier, and the target device is accessed based on the type of the target device.

14 Claims, 9 Drawing Sheets

| NO. | POWERSHELL(WIN) | SSH | TELNET |
|---|---|---|---|
| 1 | ADMINISTRATOR/ ABC 123 | ADMIN/ ADMIN | ADMIN/ ADMIN |
| 2 | USER/ PASSWORD | ROOT/ PASSW0RD | ROOT/ PASSW0RD |
| 3 | GUEST/ GUEST | SUPERUSER/ SUP3R | SUPERUSER/ SUP3R |
| ... | ... | ... | ... |

| Reference Type | 1750/1751 (DS8000 cmd) | 2044 (Smcli) | 3389 (Win PowerShell) | 7778 (Xcli) | 12301/12311 (DS8K, Telnet) | 26 (Storwize root SSH) | 22 (SSH) | 23 (Telnet) | Numeric Identifier (binary to decimal) |
|---|---|---|---|---|---|---|---|---|---|
| Linux/Unix | 0 | 0 | 0 | 0 | 0 | 0 | 1 | 1 | 192 |
| Windows | 0 | 0 | 1 | 0 | 0 | 0 | 0 | 0 | 4 |
| Vmware | 0 | 0 | 0 | 0 | 0 | 0 | 1 | 0 | 64 |
| Storwize | 0 | 0 | 0 | 0 | 0 | 1 | 1 | 0 | 96 |
| DS8000 | 1 | 0 | 0 | 0 | 1 | 0 | 1 | 0 | 81 |
| XIV | 0 | 0 | 0 | 1 | 0 | 0 | 1 | 0 | 72 |
| DS3/4/5000 | 0 | 1 | 0 | 0 | 0 | 0 | 0 | 1 | 130 |
| FC switch | 0 | 0 | 0 | 0 | 0 | 0 | 1 | 1 | 192 |
| FCoE switch | 0 | 0 | 0 | 0 | 0 | 0 | 1 | 1 | 192 |
| Apcon | 0 | 0 | 0 | 0 | 0 | 0 | 1 | 0 | 64 |
| New device 1 | 0 | 0 | 0 | 0 | 0 | 0 | 0 | 1 | 128 |
| New device 2 | 0 | 0 | 0 | 0 | 0 | 0 | 1 | 1 | 192 |
| … | | | | | | | | | … |

| Reference Type | 1750/1751 (DS8000 cmd) | 2044 (Smcli) | 3389 (Win PowerShell) | 7778 (Xcli) | 12301/12311 (DS8K Telnet) | 26 (Storwize rcon SSH) | 22 (SSH) | 23 (Telnet) | Numeric identifier (binary to decimal) | 21 | 80 | 111 | 135 | 139 | 161 | 427 | 443 | 512/513/514 | 902 | 2222 | 3260 | 5989 | 8443 | ? | ? | Numeric identifier (binary to decimal) |
|---|---|---|---|---|---|---|---|---|---|---|---|---|---|---|---|---|---|---|---|---|---|---|---|---|---|---|
| Linux/Unix | 0 | 0 | 0 | 0 | 0 | 0 | 1 | 1 | 192 | 1 | 0 | 0 | 0 | 0 | 0 | 0 | 0 | 0 | 0 | 0 | 0 | 0 | 0 | 0 | 0 | 1 |
| Windows | 0 | 0 | 1 | 0 | 0 | 0 | 0 | 0 | 4 | 0 | 0 | 0 | 1 | 1 | 0 | 0 | 0 | 0 | 0 | 0 | 0 | 0 | 0 | 0 | 0 | 24 |
| Vmware | 0 | 0 | 0 | 0 | 0 | 0 | 1 | 0 | 64 | 0 | 1 | 0 | 0 | 0 | 0 | 1 | 1 | 0 | 1 | 0 | 0 | 0 | 0 | 0 | 0 | 706 |
| Storwize | 0 | 0 | 0 | 0 | 0 | 1 | 1 | 0 | 96 | 0 | 1 | 0 | 0 | 0 | 0 | 0 | 0 | 0 | 0 | 1 | 0 | 0 | 1 | 0 | 0 | 9218 |
| DS8000 | 1 | 0 | 0 | 0 | 1 | 0 | 1 | 0 | 81 | 0 | 0 | 0 | 0 | 0 | 0 | 1 | 1 | 0 | 0 | 0 | 0 | 0 | 0 | 0 | 0 | 192 |
| XIV | 0 | 1 | 0 | 1 | 0 | 0 | 1 | 0 | 72 | 0 | 0 | 1 | 0 | 0 | 0 | 1 | 0 | 0 | 0 | 1 | 0 | 1 | 0 | 0 | 0 | 5184 |
| DS3/4/5000 | 0 | 1 | 0 | 0 | 0 | 0 | 0 | 1 | 130 | 0 | 0 | 0 | 0 | 0 | 0 | 0 | 0 | 0 | 0 | 0 | 0 | 0 | 0 | 0 | 0 | 0 |
| FC switch | 0 | 0 | 0 | 0 | 0 | 0 | 1 | 1 | 192 | 1 | 1 | 0 | 0 | 0 | 1 | 0 | 0 | 1 | 0 | 0 | 0 | 0 | 0 | 0 | 0 | 6 |
| FCoE switch | 0 | 0 | 0 | 0 | 0 | 0 | 1 | 1 | 192 | 0 | 0 | 0 | 0 | 0 | 0 | 1 | 1 | 0 | 0 | 0 | 0 | 0 | 0 | 0 | 0 | 417 |
| Apcon | 0 | 0 | 0 | 0 | 0 | 0 | 1 | 0 | 64 | 0 | 1 | 0 | 0 | 0 | 0 | 0 | 0 | 1 | 0 | 0 | 0 | 0 | 0 | 0 | 0 | 2 |
| New device 1 | 0 | 0 | 0 | 0 | 0 | 0 | 0 | 1 | 128 | 1 | 1 | 0 | 0 | 0 | 0 | 0 | 1 | 1 | 0 | 0 | 0 | 0 | 0 | 0 | 0 | 131 |
| New device 2 | 0 | 0 | 0 | 0 | 0 | 0 | 1 | 1 | 192 | 1 | 1 | 0 | 0 | 0 | 0 | 0 | 0 | 0 | 0 | 0 | 0 | 0 | 0 | 0 | 0 | 3 |
| ... | | | | | | | | | | | | | | | | | | | | | | | | | | ... |

| Reference Type | Powershell (Win) | SSH | Telnet | DScli | SMcli |
|---|---|---|---|---|---|
| Linux/Unix |  | 1 | 1 | ⋮ | ⋮ |
| Windows | 1 |  |  | ⋮ | ⋮ |
| Vmware |  | 1 | 1 | ⋮ | ⋮ |
| Storwize |  | 1 |  | ⋮ | ⋮ |
| DS8000 |  |  | 1 | ⋮ | ⋮ |
| XIV |  |  |  | ⋮ | ⋮ |
| DS3/4/5000 |  | 1 | 1 | ⋮ | ⋮ |
| FC switch |  | 1 | 1 | ⋮ | ⋮ |
| FCoE switch |  |  | 1 | ⋮ | ⋮ |
| Apcon |  | 1 | 1 | ⋮ | ⋮ |
| New device 1 |  |  | 1 | ⋮ | ⋮ |
| New device 2 |  |  |  | ⋮ | ⋮ |
| ⋮ |  |  |  |  |  |

| Reference Type | Powershell (Win) | | | | SSH | | | | Telnet | | | | DScli | SMcli |
|---|---|---|---|---|---|---|---|---|---|---|---|---|---|---|
| | Administrator/abc123 | user/password | guest/guest | .../... | admin/admin | root/password | superuser/sup3r | .../... | admin/admin | root/password | superuser/sup3r | .../... | ... | ... |
| Linux/Unix | 0 | 0 | 0 | 0 | 0 | 92 | 0 | 3 | 0 | 4 | 0 | 2 | ... | ... |
| Windows | 89 | 31 | 3 | 12 | 0 | 0 | 0 | 0 | 0 | 0 | 0 | 0 | ... | ... |
| Vmware | 0 | 0 | 0 | 0 | 0 | 40 | 0 | 0 | 0 | 35 | 0 | 0 | ... | ... |
| Storwize | 0 | 0 | 0 | 0 | 0 | 0 | 14 | 3 | 0 | 0 | 0 | 0 | ... | ... |
| DS8000 | 0 | 0 | 0 | 0 | 0 | 0 | 0 | 0 | 0 | 10 | 0 | 0 | ... | ... |
| XIV | 0 | 0 | 0 | 0 | 0 | 0 | 0 | 0 | 0 | 0 | 0 | 0 | ... | ... |
| DS3/4/5000 | 0 | 0 | 0 | 0 | 21 | 0 | 0 | 0 | 0 | 20 | 0 | 0 | ... | ... |
| FC switch | 0 | 0 | 0 | 0 | 9 | 0 | 0 | 0 | 9 | 0 | 0 | 0 | ... | ... |
| FCoE switch | 0 | 0 | 0 | 0 | 0 | 0 | 0 | 0 | 16 | 0 | 0 | 0 | ... | ... |
| Apcon | 0 | 0 | 0 | 0 | 0 | 0 | 0 | 0 | 7 | 1 | 0 | 0 | ... | ... |
| New device 1 | 0 | 0 | 0 | 0 | 0 | 0 | 2 | 7 | 0 | 0 | 2 | 7 | ... | ... |
| New device 2 | 0 | 0 | 0 | 0 | 0 | 0 | 0 | 0 | 0 | 0 | 0 | 0 | ... | ... |

ADAPTIVE MECHANISM FOR EFFICIENT USER CREDENTIALS IDENTIFICATION IN A DYNAMIC HARDWARE ENVIRONMENT

BACKGROUND

The present invention relates generally to the field of network optimization, and more particularly to protocol and credential identification.

With developments of computer and network technologies, the number and type of devices in a data center of an organization grow fast. In order to maintain daily operations of these devices, administrators of the data center need to log in these devices and update the data stored thereon from time to time. However, due to the diversity of the devices, it may be a time consuming job to determine how to log in the devices.

The devices may be roughly divided into several types such as hosts, storage devices, network devices (such as switches) and the like. Various of these devices are deployed in the main data center, thus it is possible for the administrator to manually check configurations (such as types, supported communication protocols and credentials) of these devices and then log in these devices according to the configurations. While various devices may be remotely distributed far away and it may be hard to determine the configurations for device management.

SUMMARY

In various embodiments of the present invention, a computer-implemented method is proposed. According to the method, an identifier of a target device is obtained based on state information of a plurality of ports in the target device. A type of the target device is identified based on the obtained identifier. The target device is accessed based on the type of the target device.

In various embodiments of the present invention, a computing system is proposed. The computing system comprises a computer processor coupled to a computer-readable memory unit, the memory unit comprising instructions that when executed by the computer processor implements a method. In the method, an identifier of a target device is obtained based on state information of a plurality of ports in the target device. Then, a type of the target device is identified based on the obtained identifier. Next, the target device is accessed based on the type of the target device.

Additional embodiments include, a computer program product is proposed. The computer program product is tangibly stored on a non-transient machine readable medium and comprising executable instructions which, when executed on an electronic device, cause the electronic device to: obtain an identifier of a target device based on state information of a plurality of ports in the target device; identify a type of the target device based on the obtained identifier; and access the target device based on the type of the target device.

It should be appreciated that the above summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

FIG. 3 schematically illustrates typical communication protocols and credentials for logging in various types of devices;

FIG. 5 schematically illustrates an example type-port mapping table according to one embodiment of the present invention;

FIG. 6 schematically illustrates an example type-port mapping table according to one embodiment of the present invention;

FIG. 7 schematically illustrates an example table defining communication protocols supported by various types of device according to one embodiment of the present invention;

FIG. 8 schematically illustrates an example credential table according to one embodiment of the present invention, where the numbers shown in the table represent the respective frequencies of target devices identified with the type, the protocol and the credential.

DETAILED DESCRIPTION

Principle of the present invention will now be described with reference to various example embodiments. It should be appreciated that these embodiments are described only for the purpose of illustration and help those skilled in the art to understand and implement the present invention, without suggesting any limitations as to the scope of the invention. The invention described herein may be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
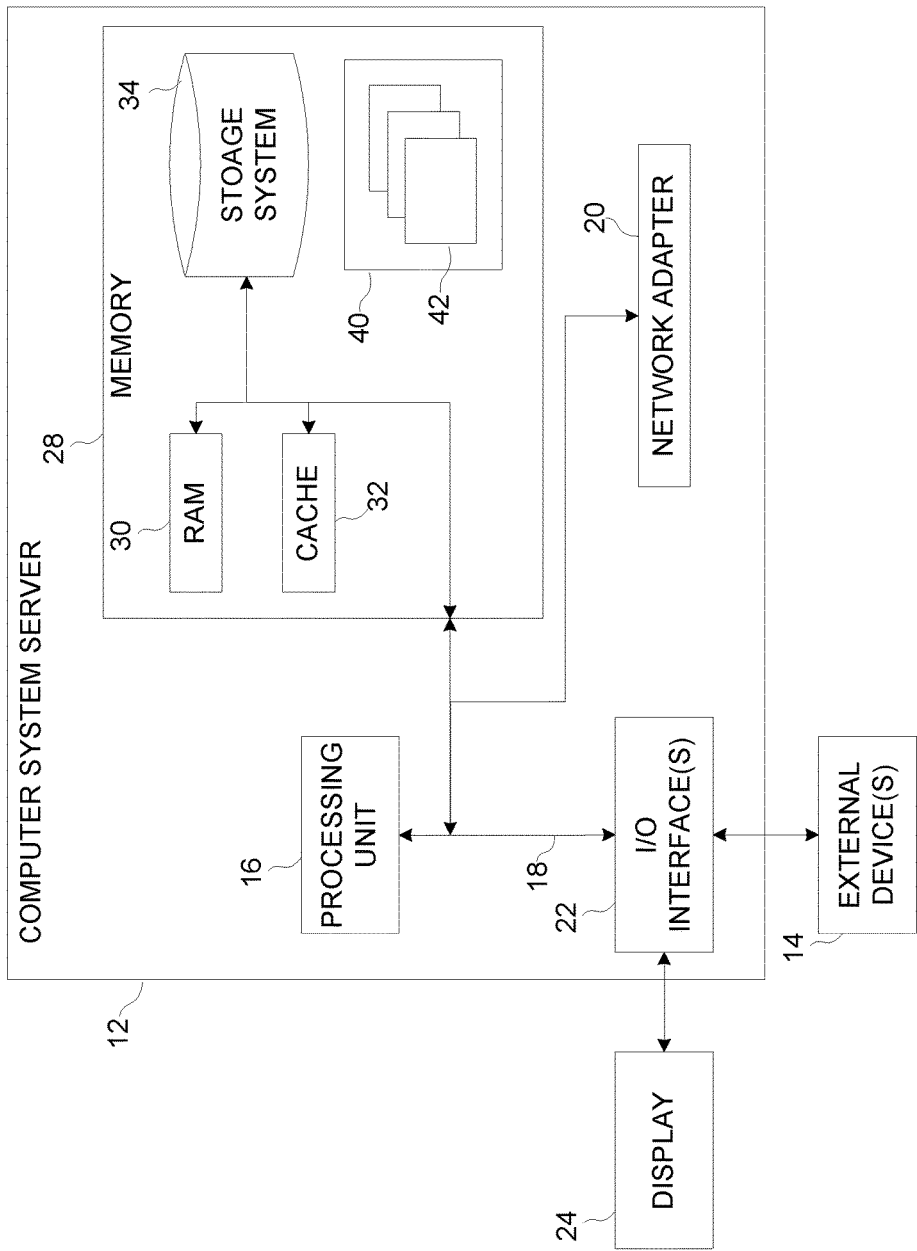
FIG. 1 schematically illustrates a block diagram of an electronic device in which embodiments of the present invention may be implemented.

In reference to FIG. 1, in which an example electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or various combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

The computer system/server 12 illustrate in FIG. 1 is only an example for implementing the embodiments of the present invention. And the detailed embodiments may be implemented at the host for controlling the data center, or even be implemented at a server.

Figure 2:
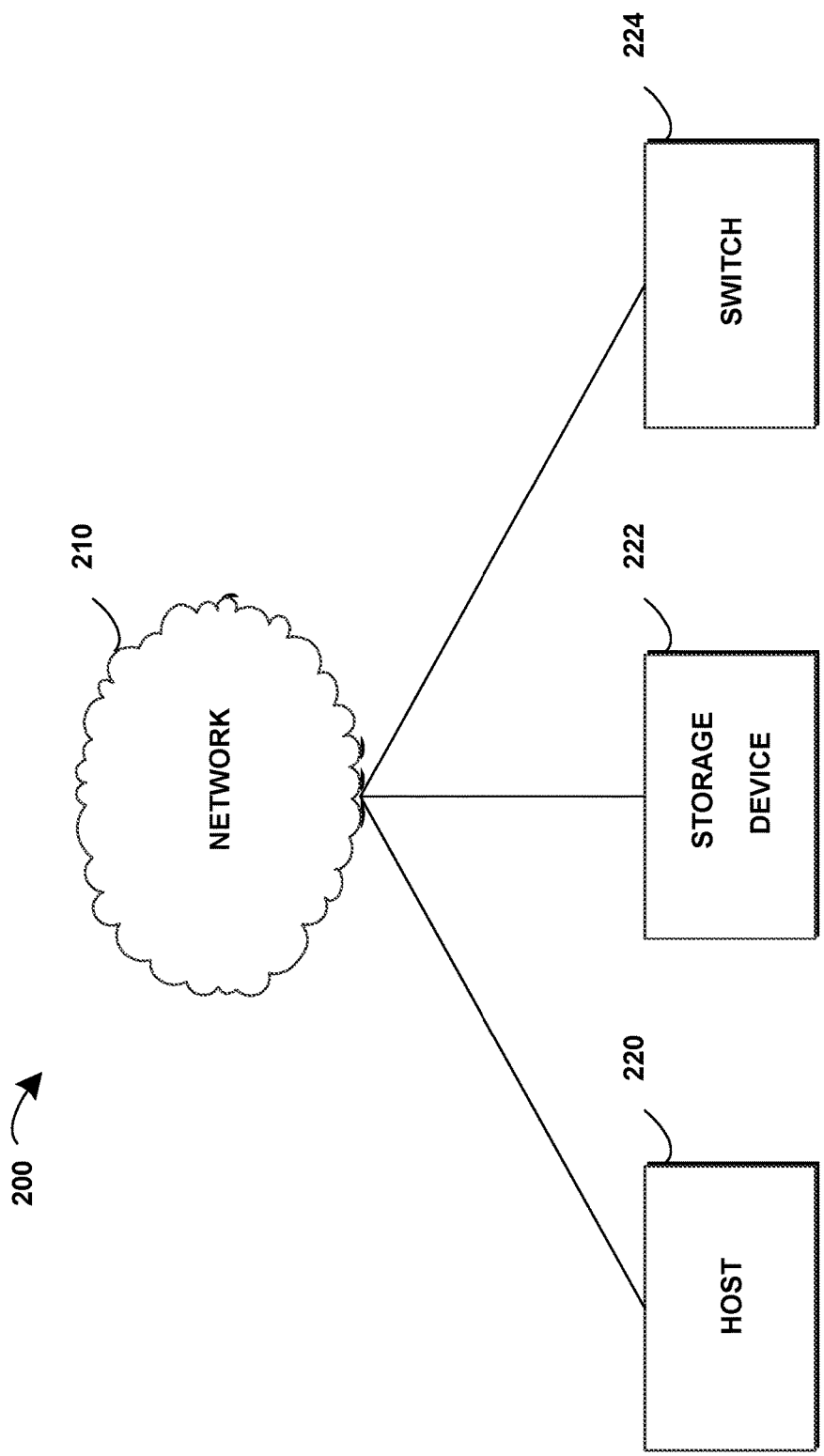
FIG. 2 schematically illustrates a block diagram of a data center including various types of devices.

FIG. 2 schematically illustrates a block diagram of a data center including various types of devices in a typical organization such as a website offering online services. Different types of devices may be deployed in a data center 200, and types of the devices in the data center 200 may comprise: a host 220 for controlling other devices in the data center 200, a storage device 222 for storing data and configurations in the data center 200, and a switch 224 for interconnecting the devices. Further, all these devices may be connected to an external network 210.

In various embodiments of the present invention, the data center is a logical term and refers to a collection of the devices for a specific purpose. For an online service provider, the data center may involve a collection of the hosts and servers; while for a school, the data center may involve the desktops and other devices deployed in the school. Although only the host 220, the storage device 222 and the switch 224 are illustrated in FIG. 2, other types of devices may be included in the data center 200 and multiple devices of a same type may be deployed. Further, each type may be subdivided into detailed categories. For example, the switch 224 may include a Fiber Channel (FC) switch, a Fiber Channel over Ethernet (FCoE) switch, and the like.

Various types of the device may support various communication protocols and multiple predefined credentials may be used in accessing the devices. For example, a host installed with the Windows Operation System (OS) may support Powershell (Win) communication protocol, and the FC switch may support both of the Secure Shell (SSH) protocol and Telnet protocol. Usually, the credential may be defined as a pair of an account and a password. For example, the above host may be logged in with a credential of "Administrator/abc123" according to the Powershell (Win) protocol, and the FC switch may be logged in with a credential of "admin/admin" according to the SSH protocol. Considering the diversity of the target devices, it may be difficult for the administrator to determine the appropriate communication protocol and credential for accessing each of the target devices in the data center.

Various approaches have been developed to manage a large number of disparate devices in the data center. For example, in the data center, credentials for a certain communication protocol are predefined by the administrator and recorded in a table as illustrated in FIG. 3 for device management. In reference to FIG. 3, the table 300 includes typical communication protocols and credentials for logging in various types of devices in the data center. Further, the type of each target device may also be recorded.

The administrator may log in each of these devices based on the types and credentials of these devices during running the data center. However, the type of each device may change, for example, a host installed with a Linux OS may be changed to a Windows OS, and meanwhile the credentials may also change. The table may be manually updated when the configuration of each device is modified. Otherwise, there is a potential risk that the administrator cannot access to the devices due to the change in the configuration of the device.

In view of the above, it may be advantageous to develop a technical solution for managing the target devices in the data center thereby accessing the target device in a fast and accurate manner so as to implement further control actions. According to one embodiment of the present invention, a computer-implemented method is proposed. According to the method, an identifier of a target device is obtained based on state information of a plurality of ports in the target device; a type of the target device is identified based on the obtained identifier; and the target device is accessed based on the type of the target device.

In the data center, once the target device is launched, ports in the target device may be enabled or disabled based on the type of the target device. For example, a host installed with a Linux/Unix OS usually sets its ports No. 22 and No. 23 to enabled states for supporting the SSH protocol and the Telnet protocol respectively, and a host installed with a Windows OS usually sets the port No. 3389 to an enabled state for supporting the PowerShell (Win) protocol. Based on statistics, if ports No. 22 and No. 23 of a device are enabled, then there is a high possibility that the device is a host installed with the Linux/Unix OS; and if the port No. 3389 of a device is enabled, then the device may likely be a host installed with the Windows OS. Accordingly, the states of the ports may be considered as signatures of the devices of a certain type. Based on the above, the present invention proposes a method for identifying the type of the target device according to the port states. Further, the target device may be accessed according to the type of the device.

Figure 4:
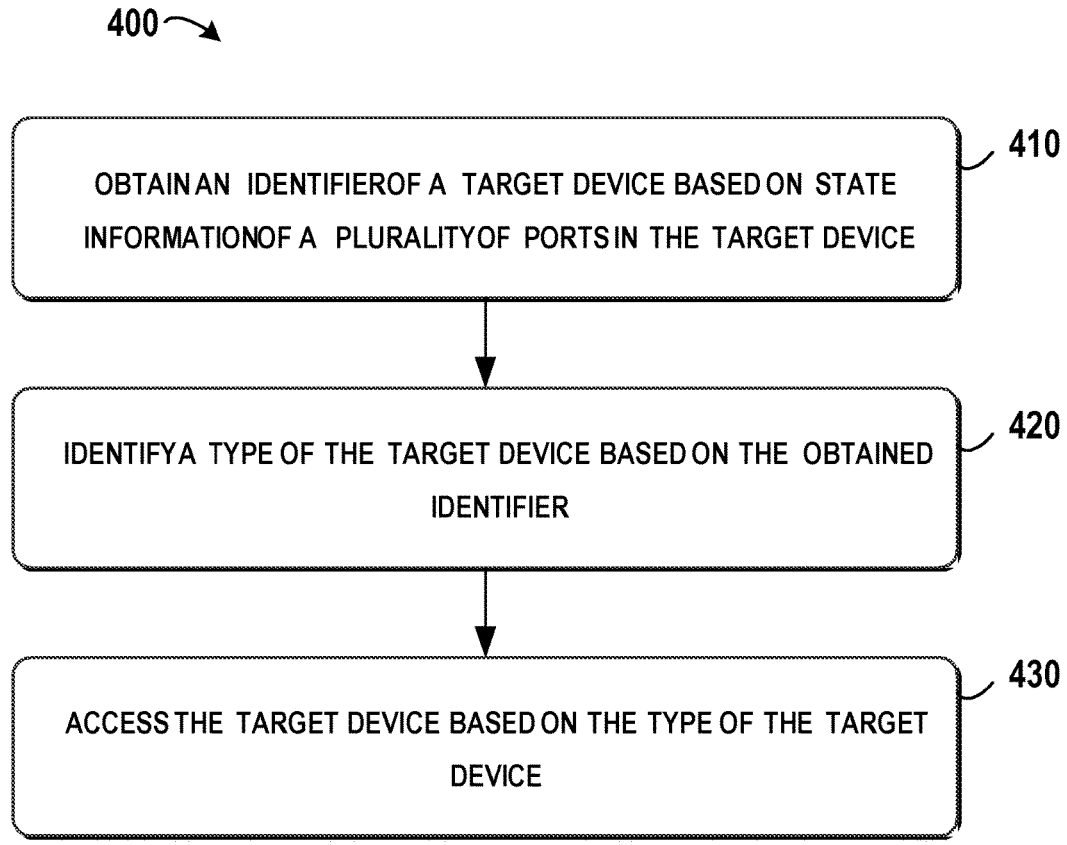
FIG. 4 schematically illustrates a flowchart of a method for accessing a target device according to one embodiment of the present invention.

FIG. 4 schematically illustrates a flowchart of a method for accessing a target device according to one embodiment of the present invention. As illustrated in FIG. 4, an identifier of a target device is obtained based on state information of a plurality of ports in the target device in Step 410. A port is an endpoint of communication in the target device. Usually, a port is associated with an IP address of a host and the protocol type of the communication protocol. In this embodiment, the plurality of ports may be stored in a list, a queue or another data structure. For simplicity, details of the embodiments of the present invention will be described by taking a list as an example data structure for storing the plurality of ports.

According to the present invention, specific port numbers may be used to identify specific services. The states (ON/OFF) of the ports in the target device may indicate the type of the target device to a certain extent. In this step, the identifier may be represented by a vector, where each dimension in the vector indicates the state of each port in the list with a value of "0" or "1." In this step, portions or all of the port numbers in the target device may be included in the list. In one embodiment, various typical port numbers for providing basic information of the target device (such as the basic type of the target device) may be included in the list; in another embodiment, various additional port numbers for providing further details of the target device (such as the OS installed on the target device and the like) may be included in the list. In a further embodiment, even all port numbers may be included in the list.

In Step 420, a type of the target device is identified based on the obtained identifier. As the identifier shows the state information of the desired ports, further the type of the target device may be identified based on a predefined association relationship between the types and the identifiers. The association relationship may be defined based on historical statistics in identifying various devices. For example, the administrator may check the states of portions or all of the ports in each of the device in the data center, and then create a table recording the association relationship.

In Step 430, the target device is accessed based on the type of the target device. Usually, the method for accessing the target device is dependent on the type of the target device. Typically, a host installed with a Linux/Unix OS may support SSH protocol and Telnet protocol, and thus this host may be accessed from port No. 22 according to SSH protocol or from port No. 23 according to Telnet protocol respectively. Further a host installed with a Windows OS may support the PowerShell (Win) protocol at port No. 3389, and thus this host may be accessed from port No. 3389 according to the PowerShell (Win) protocol.

With the type identified in Step 420, the administrator may determine an appropriate way to access the target device. In details, the administrator may access the target device according to the communication protocol and port supported by the type of the target device. Although the above paragraphs describe the embodiments by with examples of accessing the target device by the administrator, additionally and/or alternatively, the target device may be accessed by a software application or other tools.

In one embodiment of the present invention, an enabled port in the target device may be detected by scanning the plurality of ports in the target device; and then the identifier of the target device may be generated based on the detected enabled port.

Various approaches have been proposed for detecting the states of the ports in the target devices. For example, by using "nmap" and/or similar utilities, it is possible to determine the enabled ports and then get various clues to the type of target device. According to the present invention, the state information of various specific ports of the device may be considered as the signature of the target device. Specifically, the type of the target device and even the type of operating system installed on the target device may be determined based on the port state of the target device and statistics of various known devices. Further, the statistics may be helpful when selecting the most likely protocol and credential to make a successful connection to the target device.

The granularity of the type of the device may vary. For example, the type may be roughly classified into a host, a storage device and a switch based on functions of the device. When the type of the OS installed on the device is considered, the type of "host" may be subdivided into sub-types such as "the host installed with the Linux/Unix OS" and "the host installed with the Windows OS." Likewise, the storage device may be subdivided into sub-types according to the detailed models of the device, and/or the manufactures of the storage device.

According to the granularity of the type, the list may comprise different ports. In one embodiment of the present invention, the list may comprise connectable ports in the target device. In the device, the port number may be represented by a 16-bit unsigned integer ranging from 0 to 65535. Among these ports, various ports are connectable when they are enabled (state: ON), while various ports cannot be connected even if they are enabled. Further, the functions of various ports are not defined and are reserved for future use.

Each of the connectable ports is defined for a specific function, for example, the port No. 22 is used for SSH protocol and the port No. 23 is used for Telnet protocol. Further, the connectable ports may be selected from ports No. 22, 23, 26, 12301, 12311, 7778, 3389, 2044, 1750, 1751, and other ports. It should be appreciated that the above paragraph provides example connectable port numbers, and the connectable ports included in the list may vary according to the types of devices in the data center. For example, if the data center is built for containing hosts installed with Linux/Unix or Windows, then the list may include ports No. 22, 23 and 3389, and the port numbers associated with the storage devices and switches may be removed. Further, the above port numbers may be arranged in a different order.

In one embodiment of the present invention, a reference type matching the identifier may be retrieved from type-to-port mapping as the type of the target device, where the type-to-port mapping may indicate associations between reference types and identifiers of devices, the identifiers of the devices may be generated based on state information of lists of ports in the respective devices. The type-to-port mapping may be stored in mapping tables as illustrated in FIG. 5 and FIG. 6. It should be appreciated that the mapping tables are only examples for the mapping and those skilled in the art may design other types of data structures for storing the mapping.

In one embodiment of the present invention, the basic type of the target device may be determined based on whether the connectable ports in the target device are enabled or disabled. FIG. 5 schematically illustrates an example type-port mapping table according to one embodiment of the present invention. According to FIG. 5, 8 typical connectable ports are included for identifying the type of the target device, where the first row of the table illustrates descriptions of the 8 typical connectable ports (No. 1750/1751, No. 2044, No. 3389, No. 7778, No. 12301/12311, No. 26, No. 22, and No. 23). The first column illustrates the reference type of the target device. In FIG. 5, a row 510 indicates a host installed with the Linux/Unix OS and the state information of the connectable ports is represented as a vector of "0, 0, 0, 0, 0, 0, 1, 1." The value of "1/0" indicates the "ON/OFF" state of the corresponding port in the target device.

With regard to the row 510, the value "1" corresponding to "22(SSH)" (as illustrated with the column 530) indicates that the port No. 22 of the target device is enabled for accepting a connection according to the SSH protocol. Further, the value "1" corresponding to "23(Telnet)" (as illustrated with the column 540) indicates that the port number 23 of the target device is enabled for accepting a connection according to the Telnet protocol. According to the above method, the identifier of the host installed with the Linux/Unix OS may be represented as "00000011." Similarly, according to the row 520 in FIG. 5, the identifier of the FC switch may also be "00000011."

According to the above descriptions, the identifier of the target device may be represented in a binary format. If a great number of ports are involved in the list, then the identifier may comprise a plurality of bits and cause additional efforts in saving and comparing. Accordingly, the binary identifier may be encoded into a simple format that is easy to be processed.

In one embodiment of the present invention, each bit of the identifier of the target device may be weighted and the identifier may be encoded into a simple identifier. For example, the bit for the port "1750/1751 (DS8000 cmd)" may be weighted with "1," the bit for the port "2044(Smcli)" may be weighted with "2," . . . , and the bit for the port "23 (Telnet)" may be weighted with "128." Further, the sum of all the weighted values may be taken as the identifier of the target device. With this method, the identifier "00000011" for the host installed with the Linux/Unix OS may be encoded into "192," and the identifier "00100000" of the host installed with the Windows OS may be encoded into "4."

Alternatively, the identifier may be directly encoded from a binary format into a decimal format. Continuing the above example, the identifier "00000011" for the host installed with the Linux/Unix OS may be encoded into "3," and the identifier "00100000" of the host installed with the Windows OS may be encoded into "32." It should be appreciated that the table illustrated in FIG. 5 is only an example mapping table, and those skilled in the art may adjust the specific content of the table according to the idea of the present invention. For example, the port numbers listed in the first row may be resorted according to an ascending order, a descending order or randomly.

In the above embodiment, only the state information of the connectable ports of the target device is considered in obtaining the identifier. Although the connectable ports may identify the type to a certain degree, confusions may occur due to the granularity of the type.

Accordingly, the administrator needs to know further detailed type of the target device, such that the appreciated communication protocol and credential may be selected for accessing the target. According to the mapping table as illustrated in FIG. 5, the both identifiers of the host installed with the Linux/Unix OS (as illustrated with in the row 510) and FC switch (as illustrated in the row 520) may be "00000011 (192)." If the identifier determined in Step 410 is "192" (where "192" is encoded from the vector of "00000011" based on the connectable ports as illustrated in FIG. 5), then the reference type of the target device may be one of "Linux/Unix," "FC switch," and "FCoE switch" based on the type-port mapping table of FIG. 5. In this embodiment, as the reference type cannot accurately indicate a specific type, the administrator should connect the target device by trying all the three possible types, one by one. In view of the above, in order to identify the difference between the host and the FC switch, the granularity of the type in FIG. 5 should be increased.

In one embodiment of the present invention, the list may further comprise additional ports that may be enabled in the target device. Besides the connectable ports as illustrated in FIG. 5, the target device may have additional ports enabled. The additional ports may comprise ports that are enabled for other purposes. For example, the port No. 21 may be enabled for the File Transfer Protocol (FTP), the port No. 80 may be enabled for the Hypertext Transfer Protocol (HTTP) in the World Wide Web, and the port No. 443 may be enabled for Hypertext Transfer Protocol Secure (HTTPS). In the present invention, additional information of the target device may be obtained by scanning the states of the above additional ports. Similarly, the state information of the additional ports may be represented by another vector and each dimension of the vector may indicate the state of one port in the additional ports.

FIG. 6 schematically illustrates an example mapping table according to one embodiment of the present invention. Compared with the mapping table in FIG. 5, the identifiers of the target table in FIG. 6 further comprise the states of the additional ports. In FIG. 6, the columns illustrated by 610 represent the states of the connectable ports, and the column illustrated by 612 represents the sub-indicator encoded from the columns 610. Further, the columns illustrated by 620 represent the states of the additional ports, and the column illustrated by 622 represents the sub-indicator encoded from the columns 620. The method for generating the sub-indicator in column 622 is similar as that described in the above paragraphs and details will be omitted.

In this embodiment, both of the connectable ports and the additional ports of the target device are considered, and an accurate reference type may be obtained. FIG. 6 schematically illustrates an example type-port mapping table including both of the connectable ports and the additional ports according to one embodiment of the present invention. The type may be indicated by a sub-identifier for the connectable ports and a sub-identifier for the additional ports. As illustrated in the row 630 of FIG. 6, the sub-identifier for the connectable ports may be "192" (where "192" is encoded from the state information "0000 0011" for the connectable ports), and the sub-identifier for the additional ports may be "1" (where "1" is encoded from the state information of "1000 0000 0000 0000" for the additional ports). The reference type of the target device with the identifier of "192, 1" may be "Linux/Unix" based on the mapping table 600.

Further, as illustrated in the row 632 in FIG. 6, if the identifier of a target device is determined to be "192, 6," where the sub-identifier for the connectable ports is "192," and the sub-identifier for the additional ports is "6," the reference type of the target device may be "FC switch." According to the mapping table of FIG. 6, although the sub-identifiers for the connectable ports are "192" for both of the row 630 and 632, the sub-identifiers for the additional ports are different. When the states of both of the connectable and the additional ports are scanned, the reference type of the target device may be determined in a more accurate way and the administrator may access the target according to the communication protocol supported by the reference type.

The above paragraphs describe the situation of a successful retrieval of the reference type from the type-port mapping table, however the retrieval may fail. In one embodiment of the present invention, in response to missing the reference type, an entry indicating an association between a new reference type and the identifier of the target device may be added into the type-to-port mapping, where the new reference type may be the type of the target device.

If the type-port mapping table includes only limited amount of association relationship, and then it is possible that no reference type matching the type of the target device may be found in the type-port mapping table. The target device may possibly be a new type which is not recorded in the mapping table. Thus, the type of the target device may be checked (for example, the administrator may manually operate on the target device and find out the specific type). Further, the new type and the identifier of the target device of the new type may be added into the mapping table.

Further in FIG. 6, rows 640 and 642 illustrate two rows that are newly added into the mapping table 600, the procedure of which is described below. Initially, the rows 640 and 642 are not recorded in the mapping table 600. After ports of a target device are scanned, the sub-identifier for the connectable ports may be determined as "128" and the sub-identifier for the additional ports may be determined as "131." When the sub-identifiers of "128" and "131" are used as keywords for looking up the reference type in the mapping table 600, a failure may occur.

A new reference type named "New device 1" may be added into the mapping table. As illustrated in the row 640, the sub-identifiers for the connectable ports and the additional ports may be "128" and "131," respectively. The administrator may manually check the type of the target device. For example, if the target device is an IBM® storage device, then the reference type field in the row 640 may be updated with the specific model of the storage device. Similarly, another row 642 may be added into the mapping table 600 based on the identifier and the type of the target device. It should be appreciated that IBM® is a trademark of International Business Machines Corporation in the United States and/or other countries.

According to the embodiment of the present invention, the type-port mapping table may be gradually updated with data that is collected from the new types of target devices newly added into the data center. The type-port mapping table may be proactively updated by the administrator when a new type of device is deployed in the data center.

In one embodiment of the present invention, a communication protocol supported by the type of the target device may be obtained, and then the target device may be connected according to the obtained communication protocol.

FIG. 7 schematically illustrates a table defining communication protocols supported by various types of device according to one embodiment of the present invention. The table as illustrated in FIG. 7 may be generated based on the historical statistics. Various types of the device support different communication protocols. For example, the host installed with the Linux/Unix OS may support SSH and Telnet, while the host installed with the Windows OS may support Powershell (Win). The types of target devices and the communication protocols supported by the types may be recorded in a lookup table and then an appropriate communication protocol may be retrieved from the lookup table by using the type as the keyword.

When the type of the target device is determined, the communication protocol(s) supported by the type may be obtained from the lookup table as illustrated in FIG. 7. For example, regarding a host installed with the Linux/Unix OS (as illustrated in the row 710), the administrator may connect to the target device according to SSH or Telnet. Specifically, the administrator may try the supported communication protocol one by one until a success in connecting to the target device. For another example, with respect to a FC switch as illustrated in the row 720, the SSH or Telnet may be used in connecting to the target device.

In one embodiment of the present invention, in order to connect to the target device according to the communication protocol, a credential may be determined based on the type, and then the target device may be logged in with the determined credential according to the communication protocol. It should be appreciated that, the present disclosure does not limit the time points for determining the communication protocol and the credential. For example, the communication protocol may be determined first and then the credential may be determined during connecting the target device. For another example, the credential and the communication protocol may be determined at the same time or successively.

Usually, a credential (such as a pair of an account and a password) is required in accessing the target device. The known credential used in logging in the device of a certain type successfully may be recorded in a data structure such that the target device of the same type may be entered based on the known credential. In one embodiment of the present invention, during determining the credential, a reference credential matching the type of the target device may be retrieved from a credential repository as the credential, the credential repository storing at least one credential that has been used in logging in a device of the type of the target device successfully.

Those skilled in the art may adopt any data structure for recording the known credential for entering into devices of various types. An example of the data structure for storing the credentials for various types of devices is represented in the table below.

TABLE 1

Example Data Structure

| Type | Communication Protocol | Credential |
|---|---|---|
| Linux/Unix | SSH | admin/admin |
|  |  | root/password |
|  |  | Superuser/sup3r |
|  |  | .../... |
|  | Telnet | admin/admin |
|  |  | root/password |
|  |  | Superuser/sup3r |

TABLE 1-continued

Example Data Structure

| Type | Communication Protocol | Credential |
|---|---|---|
| Windows | Powershell(Win) | .../... Administrator/abc123 user/password guest/guest .../... |
| ... | ... | .../... |

In Table 1, the first column represents the type of the target device, the second column represents the communication protocol that is supported by the type of the target device, and the third column represents the credentials that have been used for logging in a device of the type successfully. It should be appreciated that Table 1 may be generated/updated manually by the administrator of the data center based on his/her knowledge about the account and password allocated to each user, additionally and/or alternatively, the table may be automatically generated/updated from a log of a target device or in another way.

Although there may be multiple credentials in the table, it does not mean that each of the credentials may be used for entering the target device with the specified type. Instead, the credential provided in the table is a credential that has been used in logging in a device of the reference type successfully. In other words, the recommended credential may possibly enter into the target device.

For example, there are ten hosts with Linux/Unix OS in the data center, where nine of them may be entered with the credential of "admin/admin," and the tenth host cannot be entered with "admin/admin." When the administrator scans the ports of the tenth host and it may be determined to be a host with Linux/Unix OS, the administrator cannot enter the tenth host with "admin/admin," because this credential is not a correct credential. The administrator may try other credentials in the table one by one until the administrator finds a correct credential or goes through all the credentials.

In order to reduce the unnecessary time cost in trying each of the credentials one by one, the credential repository may store a number that the at least one credential has been used in logging in a device of the type successfully. Further, the reference credential may be selected based on the number.

FIG. 8 illustrates an exemplary credential table according to one embodiment of the present invention, where the numbers shown in the table represent the respective frequencies of target devices identified with the type, the protocol and the credential combination. Compared with the credential table as illustrated in Table 1, the table 800 in FIG. 8 further includes a counter field recording the number that each of the at least one credential has been used in logging in a device of the reference type successfully.

Referring to row 810 in FIG. 8, the protocol columns such as "Powershell (Win)," "SSH," "Telnet" and the like represent the communication protocols supported by each type of the target device, the sub-columns under each of the protocol illustrate the credentials, and the number at the intersection of the type and the credential indicates the counter. Refer to the row 810, the host installed with the Linux/Unix OS may be accessed according to SSH and/or Telnet protocols, where multiple credentials may be used under SSH and Telnet protocols, respectively.

In row 810, the counter fields following the type "Linux/Unix" indicates times that each of the at least one credential has been used in logging in a device of the reference type successfully. For example, in row 810, the number of "92" indicates the times that the credential "root/password" has been used in logging in a device with the type of "Linux/Unix" successfully according to the SSH protocol, and the number of "4" indicates the times that the credential "root/password" has been used in logging in a device with the type of "Linux/Unix" successfully according to the Telnet protocol.

As the counter fields of the table 800 are defined according to historical statistic of logging various types of devices according to various credentials under various communication protocols, the value of a counter field associated with a certain type and a certain credential may possibly indicate the possibility of successfully entering a target device with the certain type by using the certain credential. The greater the counter is, the higher the possibility is. Regarding a target device installed with the Linux/Unix OS, the credential "root/password" may be tried first in logging in the target device because the counter "92" indicates that the credential "root/password" has led to 92 times of successful logins, and the possibility of a successful will be high when "root/password" is used in logging in the target device.

In this embodiment, the table may be traversed in a descending order of the counter associated with respective credentials until an appropriate credential is found or all of the possible credentials have been tried. Regarding the counter as illustrated in the row 810, because the greatest counter is "92," the credential "root/password" may be tried first to log in the host installed with the Linux/Unix OS with according to SSH protocol. If this credential fails, then the credential "root/password" with the second greatest counter of "4" may be used. The administrator may try to log in the host installed with the Linux/Unix OS with the credential "root/password" according to Telnet protocol.

The row 820 in table 800 describes a situation of a FC switch. When the target device is a FC switch, because the counter "21" associated with the credential "admin/admin" for the SSH protocol is the greatest one, the FC switch may be accessed by using "admin/admin" according to the SSH protocol first. If the "admin/admin" for the SSH protocol fails, then the credential "root/password" for the Telnet protocol with the second greatest counter "20" may be used in logging in the FC switch.

In one embodiment of the present invention, in response to a success in logging in the target device with the selected credential, the number corresponding to the selected credential may be incremented.

If a target device of a certain type is successfully accessed by using a certain credential according to a certain communication protocol, then the counter associated with the certain type, the credential and the protocol may be increased by one. Regarding the row 810 in FIG. 8, if the host is successfully accessed by the credential "root/password" for the Telnet protocol, then the counter may be increased from "4" to "5." Further, regarding the row 820 in FIG. 8, if the host is successfully accessed by the credential "admin/admin" for the SSH protocol, then the counter may be increased from "21" to "22."

In one embodiment of the present invention, in response to a failure in logging into the target device with the selected credential, the number corresponding to the selected credential may be decremented.

If a target device of a certain type cannot be accessed by using a certain credential according to a certain communication protocol, then the counter associated with the certain type, the credential and the protocol may be decreased by one. Regarding the row 810 in FIG. 8, if the host cannot be accessed by the credential "root/password" for the Telnet protocol, then the counter may be decreased from "4" to "3." Further, regarding the row 820 in FIG. 8, if the host cannot be accessed by the credential "admin/admin" for the SSH protocol, then the counter may be decreased from "21" to "20."

In one embodiment of the present invention, if the selected credential fails, the number corresponding to the selected credential may be decremented; if the selected credential has never been used in logging in the target device, the number corresponding to the selected credential may remain "0." With reference to the row 810 in FIG. 8, the counter "0" indicates the credential "admin/admin" has never been used in login. If the host cannot be accessed by the credential "admin/admin" for the Telnet protocol, then, the counter "0" may remain unchanged. Similarly, regarding the row 820 in FIG. 8, if the host cannot be accessed by the credential "root/password" for the SSH protocol, then the counter "0" may remain unchanged.

In one embodiment of the present invention, the credentials for various communication protocols may be updated when a new credential is allowed for accessing the target device. For example, if a credential "superroot/superroot" is newly added to the devices for the SSH protocol, then a new sub-column of the credential "superroot/superroot" may be added into the column "SSH" in the table of in FIG. 8.

In one embodiment of the present invention, a combination of a protocol and a credential that has been used in logging into the target device successfully may be stored. Further, a number that the combination of the protocol and the credential has been used in successfully logging into the target device may also be store. The combination and the corresponding number may be stored in a data structure as illustrated in Table 2.

TABLE 2

Example Data Structure

| Type | Combination | Number |
|---|---|---|
| Linux/Unix | (SSH, admin/admin) | 0 |
| | (SSH, root/password) | 92 |
| | (SSH, Superuser/sup3r) | 0 |
| | (Telnet, admin/admin) | 0 |
| | (Telnet, root/password) | 4 |
| | (Telnet, Superuser/sup3r) | 0 |
| | (. . . , . . . /. . .) | . . . |
| Windows | (Powershell Win, Administrator/abc123) | 89 |
| | (Powershell Win, user/password) | 31 |
| | (Powershell Win, guest/guest) | 3 |
| | (. . . , . . . /. . .) | . . . |
| . . . | (. . . , . . . /. . .) | . . . |

The combination of the communication protocol and the credential indicates how to log into the target device, and the number indicates a possibility that the target device may be successfully logged in by using the combination. When the type of the target device is determined, a combination with a highest number may be selected first, if the selected combination fails, then a combination with a second high number may be selected for a next try.

The data center may comprise a plurality of hosts installed with the Windows OS and each of these hosts may be allocated with a specific IP address and support different combinations of the communication protocols and credentials. Accordingly, the IP address of the target device may be recorded for identifying a unique target device. For example, a table with a format as illustrated in Table 2 may be specified for each target device, and thus for a data center with N target devices, there may be N tables storing the combinations for the target devices. For another example, the above information for the N target devices may be recorded in one table, where the table as illustrated in Table 2 may be modified and further comprise a column for storing the IP address of the target device as illustrated in Table 3.

TABLE 3

Example Data Structure

| IP address | Type | Combination | Number |
|---|---|---|---|
| IP1 | Linux/Unix | (SSH, admin/admin) | 0 |
| | | (SSH, root/password) | 92 |
| | | (SSH, Superuser/sup3r) | 0 |
| | | (Telnet, admin/admin) | 0 |
| | | (Telnet, root/password) | 4 |
| | | (Telnet, Superuser/sup3r) | 0 |
| | | (. . . , . . . /. . .) | . . . |
| | Windows | (Powershell Win, Administrator/abc123) | 89 |
| | | (Powershell Win, user/password) | 31 |
| | | (Powershell Win, guest/guest) | 3 |
| | | (. . . , . . . /. . .) | . . . |
| IP2 | Linux/Unix | (SSH, admin/admin) | 0 |
| | | (SSH, root/password) | 10 |
| | | (SSH, Superuser/sup3r) | 0 |
| | | (Telnet, admin/admin) | 0 |
| | | (Telnet, root/password) | 4 |
| | | (Telnet, Superuser/sup3r) | 0 |
| | | (. . . , . . . /. . .) | . . . |
| | Windows | (Powershell Win, Administrator/abc123) | 10 |
| | | (Powershell Win, user/password) | 10 |
| | | (Powershell Win, guest/guest) | 3 |
| | | (. . . , . . . /. . .) | . . . |
| . . . | . . . | . . . | . . . |

It should appreciated that Table 3 is only an example data structure, in another table, the entries in the table may be sorted according to the frequencies associated with the combinations used for each IP address. Accordingly, the combinations may be selected according to the frequencies in a descending order.

Figure 9:
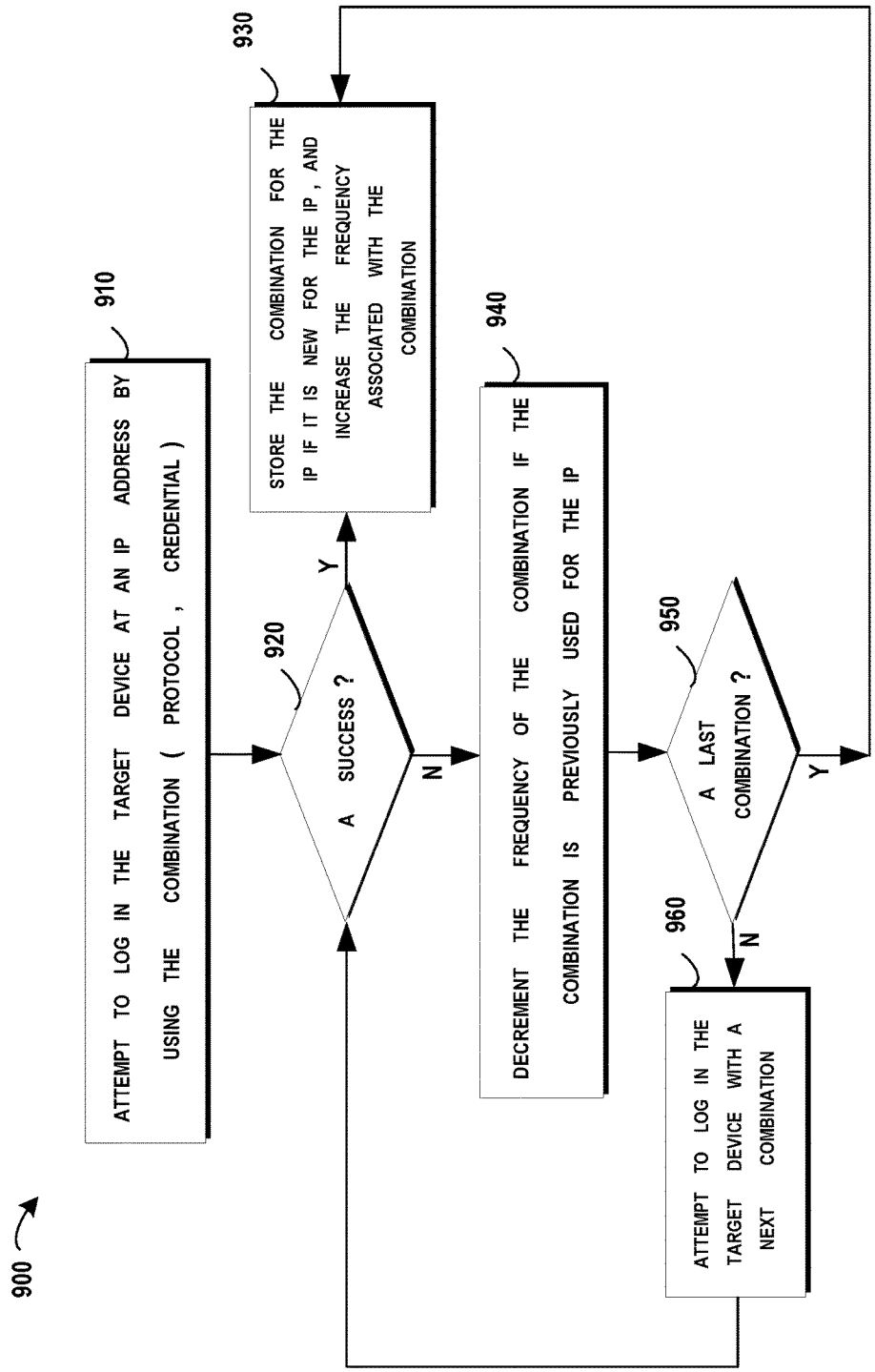
FIG. 9 schematically illustrates a flowchart of a method for accessing a target device by a combination of a protocol and a credential according to one embodiment of the present invention.

FIG. 9 schematically illustrates a flowchart of a method for accessing a target device at an IP address by a combination of a protocol and a credential according to one embodiment of the present invention. In Step 910, a target device at an IP address may be accessed by using a combination (protocol, credential). In this step, if it is determined that the target device with an IP address of IP1 is a host installed with the Windows OS, the combination of (Powershell Win, Administrator/abc123) may be selected first because the number 89 is the highest one according to Table 3. In this example, the combinations in Table 3 may be tried one by one, and at this step the first combination in the table may be tried first.

In Step 920, if it is determined that the logging step successes and the combination has been used for access the target device (in other words, the number associated with the combination is greater than "0"), then the workflow proceeds to Step 930, where the number "89" corresponding to (Powershell Win, Administrator/abc123) is incremented to "90." In another example, if it is determined that a new combination has never been used for the target device with the IP of IP1, then the new combination may be added into Table 3 and the number associated with the new combination may be set to "1." In other words, the number associated with the new combination is incremented from "0" to "1."

In Step 920, if it is determined that the logging step fails and the combination has been used for accessing the target device with the IP address of IP1, then the workflow proceeds to Step 940, where the number "89" corresponding to (Powershell Win, Administrator/abc123) is decremented to "88." In Step 950, if the combination is the last one in Table 3, then all the candidate combinations are tried; otherwise, a next combination in Table 3 may be selected in Step 960 for another try.

Although FIG. 9 illustrates an example workflow for accessing one target device with a certain IP address, it should be appreciated that the workflow as illustrated in FIG. 9 may be implemented to each target device in the data center. For example, the administrator and/or an application tool may scan respective IP addresses that are allocated to the target devices and log in the respective target devices.

In one embodiment of the present invention, in response to a failure in logging in the target device, an exception message may be provided. If access cannot be achieved after trying all the available protocols and credentials, it indicates that the information provided in the table is not enough for the device management and an exception should be provided to the administrator, who may take appropriate action to ensure success on the subsequent scan. Embodiments of the present invention propose an optimized solution for gaining access to the target devices. Specifically, the embodiments of the present invention improve efficiency in device management by scanning certain ports of the target device in the data center. Based on the port states of the target device, the type of the target device may be determined and then the target device may be logged in based on the type of the target device and the statistic of the configuration of the devices in the data center. Further, the embodiments of the present invention may further provide feedback to the administrator, facilitate credential maintenance and improve management, which in turn will further improve scan efficiency.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

In an additional embodiment of the present invention, a computing system is proposed. The computing system comprises a computer processor coupled to a computer-readable memory unit, the memory unit comprising instructions that when executed by the computer processor implements a method. In the method, an identifier of a target device is obtained based on state information of a plurality of ports in the target device. Then, a type of the target device is identified based on the obtained identifier. Next, the target device is accessed based on the type of the target device.

An enabled port in the target device may be detected by scanning the plurality of ports in the target device; and the identifier of the target device may be generated based on the detected enabled port. A reference type matching the identifier may be retrieved from type-to-port mapping as the type of the target device, where the type-to-port mapping may indicate associations between reference types and identifiers of devices, the identifiers of the devices may be generated based on state information of a plurality of ports in the respective devices. In response to missing the reference type, an entry indicating an association between a new reference type and the identifier of the target device may be added into the type-to-port mapping, where the new reference type may be the type of the target device.

A communication protocol supported by the target device may be determined according to the type of the target device; and the target device may be connected according to the communication protocol. Credentials may be determined based on the type of the target device; and the target device may be logged in with the determined credential according to the communication protocol. A reference credential matching the type of the target device may be retrieved from a credential repository as the credential, where the credential repository may store at least one credential that has been used in logging in a device of the type of the target device.

The credential repository may store the number that the at least one credential has been used in logging in a device of the type, and the reference credential may be selected based on the number. The number corresponding to the selected credential may be incremented in response to a success in logging in the target device with the selected credential, or the number corresponding to the selected credential may be decremented in response to a failure in logging into the target device with the selected credential.

The plurality of ports comprises a typical port for providing basic information of the target device in which the plurality of ports comprises a typical port for providing basic information of the target device, and an additional port for providing further details of the target device.

In an additional embodiment of the present invention, a computer program product is proposed. The computer program product is tangibly stored on a non-transient machine-readable medium and comprising machine-executable instructions. The instructions, when executed on an electronic device, cause the electronic device to: obtain an identifier of a target device based on state information of a plurality of ports in the target device; identify a type of the target device based on the obtained identifier; and access the target device based on the type of the target device.

The program instructions further cause the electronic device to detect an enabled port in the target device by scanning the plurality of ports in the target device; and generate the identifier of the target device based on the detected enabled port. The electronic device has instructions to retrieve, from type-to-port mapping, a reference type matching the identifier as the type of the target device, the type-to-port mapping indicating associations between reference types and identifiers of devices, the identifiers of the devices being generated based on state information of a plurality of ports in the respective devices. Further instructions to cause the electronic device to, in response to missing the reference type, add into the type-to-port mapping an entry indicating an association between a new reference type and the identifier of the target device, where the new reference type may be the type of the target device. The program instructions further cause the electronic device to determine a communication protocol supported by the target device. The electronic device determines a communication protocol according to the type of the target device and connect to the target device according to the communication protocol.

The program instructions further cause the electronic device to determine a credential based on the type of the target device; and log in the target device with the determined credential according to the communication protocol. The program instructions further cause the electronic device to retrieve, from a credential repository, a reference credential matching the type of the target device as the credential, the credential repository storing at least one credential that has been used in logging in a device of the type of the target device. The credential repository may store a number that the at least one credential has been used in logging in a device of the type, and the instructions further causing the electronic device to select the reference credential based on the number.

The program instructions further cause the electronic device to, in response to a success in logging in the target device with the selected credential, increment the number corresponding to the selected credential, or in response to a failure in logging into the target device with the selected credential, decrement the number corresponding to the selected credential, where the plurality of ports comprises a typical port for providing basic information of the target device. The plurality of ports comprise a typical port for providing basic information of the target device and an additional port for providing further details of the target device.

It should be appreciated that the units included in the system may be implemented by various manners, including software, hardware, firmware or a random combination thereof. For example, in various embodiments, the system may be implemented by software and/or firmware. Alternatively or additionally, the system may be implemented partially or completely based on hardware. for example, one or more units in the system 800 may be implemented as an integrated circuit (IC) chip, an application-specific integrated circuit (ASIC), a system on chip (SOC), a field programmable gate array (FPGA), etc. The scope of the present intention is not limited to this aspect.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method, comprising: obtaining an identifier of a target device based on state information of a plurality of ports in the target device, wherein the obtaining the identifier of the target device comprises: detecting an enabled port in the target device by scanning the plurality of ports in the target device; and generating the identifier of the target device based on the detected enabled port; identifying a type of the target device based on the obtained identifier, wherein the identifying the type of the target device comprises: retrieving, from type-to-port mapping, the type-to-port mapping being stored in mapping tables, a reference type matching the identifier as the type of the target device, the type-to-port mapping indicating associations between reference types and identifiers of devices, the identifiers of the devices being generated based on state information of a plurality of ports in the respective devices; communicating a plurality of user selection options to access the target device to a user based on the retrieved reference type, reducing redundancy in communicating the plurality of user selection options: in response to receiving a user selection input, determining an access type of the target device: and accessing the target device based on the identified type of the target device and user selection input.

2. The method of claim 1, further comprising: in response to missing the reference type, adding into the type-to-port mapping an entry indicating an association between a new reference type and the identifier of the target device, the new reference type being the type of the target device.

3. The method of claim 1, wherein the accessing the target device comprises: determining a communication protocol supported by the target device according to the type of the target device; and connecting to the target device according to the communication protocol.

4. The method of claim 3, wherein the connecting to the target device according to the communication protocol comprises: determining a credential based on the type of the target device; and logging into the target device with the determined credential according to the communication protocol.

5. The method of claim 4, wherein the determining the credential comprises: retrieving, from a credential repository, a reference credential matching the type of the target device as the credential, the credential repository storing at least one credential that has been used in logging into a device of the type of the target device.

6. The method of claim 5, wherein the credential repository stores a number that the at least one credential has been used in logging into a device of the type, and the retrieving the reference credential comprises: selecting the reference credential based on the number.

7. The method of claim 6, further comprising at least one of: in response to a success in logging into the target device with the selected credential, incrementing the number corresponding to the selected credential; or in response to a failure in logging into the target device with the selected credential, decrementing the number corresponding to the selected credential.

8. The method of claim 1, wherein the plurality of ports comprise at least one of: a typical port for providing basic information of the target device; and a typical port for providing basic information of the target device, and an additional port for providing further details of the target device.

9. A computing system comprising a computer processor coupled to a computer-readable memory unit, the memory unit comprising instructions that when executed by the computer processor implements a method comprising: obtaining an identifier of a target device based on state information of a plurality of ports in the target device, wherein the obtaining the identifier of the target device comprises: detecting an enabled port in the target device by scanning the plurality of ports in the target device; identifying a type of the target device based on the obtained identifier, wherein the identifying the type of the target device comprises: retrieving, from type-to-port mapping, the type-to-port mapping being stored in mapping tables, a reference type matching the identifier as the type of the target device, the type-to-port mapping indicating associations between reference types and identifiers of devices, the identifiers of the devices being generated based on state information of a plurality of ports in the respective devices; communicating a plurality of user selection options to access the target device to a user based on the retrieved reference type, reducing redundancy in communicating the plurality of user selection options; in response to receiving a user selection input, determining an access type of the target device: and accessing the target device based on the identified type of the target device and user selection input.

10. The system of claim 9, further comprising: in response to missing the reference type, adding into the type-to-port mapping an entry indicating an association between a new reference type and the identifier of the target device, the new reference type being the type of the target device.

11. The system of claim 9, wherein the accessing the target device comprises: determining a communication protocol supported by the target device according to the type of the target device; and connecting to the target device according to the communication protocol.

12. The system of claim 11, wherein the connecting to the target device according to the communication protocol comprises: determining a credential based on the type of the target device; and logging into the target device with the determined credential according to the communication protocol.

13. The system of claim 12, wherein the determining the credential comprises: retrieving, from a credential repository, a reference credential matching the type of the target device as the credential, the credential repository storing at least one credential that has been used in logging into a device of the type of the target device.

14. A computer program product being tangibly stored on a non-transient machine-readable medium and comprising machine-executable instructions, the instructions comprising: instructions to obtain an identifier of a target device based on state information of a plurality of ports in the target device, wherein the instructions to obtain the identifier of the target device comprises: instructions to detect an enabled port in the target device by scanning the plurality of ports in the target device; instructions to identify a type of the target device based on the obtained identifier, wherein the instructions to identify the type of the target device comprises: instructions to retrieve, from type-to-port mapping, the type-to-port mapping being stored in mapping tables, a reference type matching the identifier as the type of the target device, the type-to-port mapping indicating associations between reference types and identifiers of devices, the identifiers of the devices being generated based on state information of a plurality of ports in the respective devices; and instructions to communicate a plurality of user selection options to access the target device to a user based on the retrieved reference type, reducing redundancy in the instructions to communicate the plurality of user selection options: in response to receiving a user selection input, instructions to determine an access type of the target device: and instructions to access the target device based on the identified type of the target device and user selection input.

* * * * *